US012701179B2

(12) United States Patent
Kim et al.

(10) Patent No.: US 12,701,179 B2
(45) Date of Patent: Aug. 4, 2026

(54) DISPLAY DEVICE AND METHOD OF MANUFACTURING THE SAME

(71) Applicant: Samsung Display Co., LTD., Yongin-si (KR)

(72) Inventors: Ji-Hoon Kim, Yongin-si (KR); Eunmi Seo, Yongin-si (KR); Minkyoung Jung, Yongin-si (KR); Sungguk An, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 492 days.

(21) Appl. No.: 18/201,387

(22) Filed: May 24, 2023

(65) Prior Publication Data

US 2024/0080380 A1 Mar. 7, 2024

(30) Foreign Application Priority Data

Sep. 7, 2022 (KR) ........................ 10-2022-0113189

(51) Int. Cl.
| | |
|---|---|
| *H04M 1/02* | (2006.01) |
| *B32B 7/12* | (2006.01) |
| *B32B 17/06* | (2006.01) |
| *B32B 27/28* | (2006.01) |
| *B32B 27/36* | (2006.01) |

(52) U.S. Cl.
CPC ............. *H04M 1/0216* (2013.01); *B32B 7/12* (2013.01); *H04M 1/0268* (2013.01); *B32B 17/06* (2013.01); *B32B 27/281* (2013.01); *B32B 27/36* (2013.01); *B32B 2250/44* (2013.01); *B32B 2307/408* (2013.01); *B32B 2307/54* (2013.01); *B32B 2307/7376* (2023.05); *B32B 2457/20* (2013.01)

(58) Field of Classification Search
CPC ............. H04M 1/0216; H04M 1/0268; H04M 1/0214; H04M 1/0237; B32B 7/12; B32B 17/06; B32B 27/281; B32B 27/36; B32B 2250/44; B32B 2307/408; B32B 2307/54; B32B 2307/7376; B32B 2457/20; G02F 1/1333; G06F 1/1637; G06F 1/1641; G06F 1/1652; G09F 9/301
See application file for complete search history.

(56) References Cited

U.S. PATENT DOCUMENTS

| | | | |
|---|---|---|---|
| 10,029,446 B2 | 7/2018 | Lee et al. | |
| 10,586,941 B2 | 3/2020 | Lee et al. | |
| (Continued) | | | |

FOREIGN PATENT DOCUMENTS

| | | |
|---|---|---|
| KR | 1020170084402 A | 7/2017 |
| KR | 1020190115157 A | 10/2019 |
| (Continued) | | |

*Primary Examiner* — Dhaval V Patel
(74) *Attorney, Agent, or Firm* — CANTOR COLBURN LLP

(57) ABSTRACT

A display device includes a display panel folded with respect to an imaginary folding axis extending in a first direction, an anti-reflective layer disposed on the display panel, a window disposed on the anti-reflective layer, and a first adhesive layer disposed between the anti-reflective layer and the window. The first adhesive layer includes an adhesive having a change rate in a storage modulus of about 0.3 or less at a temperature of about 150 degrees Celsius (° C.) to about 200° C. with respect to the storage modulus at a temperature of about 60° C.

18 Claims, 7 Drawing Sheets

(56) References Cited

U.S. PATENT DOCUMENTS

| | | | |
|---|---|---|---|
| 11,066,580 B2 | 7/2021 | Lee et al. | |
| 11,348,487 B2 | 5/2022 | Lee et al. | |
| 11,404,655 B2 | 8/2022 | Choi et al. | |
| 2010/0182679 A1* | 7/2010 | Han | C09J 133/14 |
| | | | 524/270 |
| 2017/0287992 A1* | 10/2017 | Kwak | G06F 1/1605 |
| 2018/0045954 A1* | 2/2018 | Heiman | G02B 27/0018 |
| 2021/0187904 A1* | 6/2021 | Jeong | B32B 27/06 |
| 2021/0210690 A1 | 7/2021 | Park et al. | |
| 2021/0255670 A1* | 8/2021 | Lee | G06F 1/1652 |
| 2021/0273205 A1* | 9/2021 | Lee | H10K 50/82 |
| 2021/0311238 A1 | 10/2021 | Lee et al. | |
| 2022/0011489 A1 | 1/2022 | Kim et al. | |
| 2022/0061177 A1 | 2/2022 | Lee et al. | |

FOREIGN PATENT DOCUMENTS

| | | | |
|---|---|---|---|
| KR | 1020200097136 A | 8/2020 | |
| KR | 1020210011552 A | 2/2021 | |
| KR | 1020210082296 A | 7/2021 | |
| KR | 1020210088044 A | 7/2021 | |
| KR | 1020210104515 A | 8/2021 | |
| KR | 1020210123461 A | 10/2021 | |
| KR | 102320021 B1 | 11/2021 | |
| KR | 1020220006683 A | 1/2022 | |
| KR | 1020220023836 A | 3/2022 | |

* cited by examiner

DISPLAY DEVICE AND METHOD OF MANUFACTURING THE SAME

This application claims priority to Korean Patent Application No. 10-2022-0113189, filed on Sep. 7, 2022, and all the benefits accruing therefrom under 35 U.S.C. § 119, the content of which in its entirety is herein incorporated by reference.

BACKGROUND

1. Field

The disclosure relates to a display device and a method of manufacturing the same. More particularly, the disclosure relates to a display device including an anti-reflective layer and an adhesive layer and a method of manufacturing the display device.

2. Description of the Related Art

Various display devices that are applied to multimedia devices, such as television sets, mobile phones, tablet computers, navigation units, or game units, are being developed. In recent years, a foldable or rollable display device employing a flexible display member is being developed to facilitate portability and to improve a user's convenience.

SUMMARY

Since each component of the foldable or rollable display device is damaged when the display device is bent or rolled, each component is desired to satisfy folding reliability and stability.

The disclosure provides a display device capable of preventing a window from being damaged and reducing a generation of residues of an adhesive.

The disclosure provides a method of manufacturing the display device.

An embodiment of the inventive concept provides a display device including a display panel folded with respect to an imaginary folding axis extending in a first direction, an anti-reflective layer disposed on the display panel, a window disposed on the anti-reflective layer, and a first adhesive layer disposed between the anti-reflective layer and the window. The first adhesive layer includes an adhesive having a change rate in a storage modulus of about 0.3 or less at a temperature of about 150 degrees Celsius (° C.) to about 200° C. with respect to the storage modulus at a temperature of about 60° C.

In an embodiment, the first adhesive layer has a thickness from about 25 micrometers to about 100 micrometers.

In an embodiment, the first adhesive layer includes an adhesive having a storage modulus from about 10 kilopascals (Kpa) to about 50 Kpa at the temperature of about 60° C.

In an embodiment, one side surface of the anti-reflective layer and one side surface of the first adhesive layer adjacent to the one side surface of the anti-reflective layer are placed on a straight line when viewed in a cross-section.

In an embodiment, one side surface of the display panel adjacent to the one side surface of the anti-reflective layer is placed on the straight line when viewed in the cross-section.

In an embodiment, the one side surface of the anti-reflective layer is perpendicular to an upper surface of the display panel.

In an embodiment, the display device further includes a second adhesive layer disposed between the display panel and the anti-reflective layer.

In an embodiment, the second adhesive layer includes the adhesive having the change rate in the storage modulus of about 0.3 or less at the temperature of about 150° C. to about 200° C. with respect to the storage modulus at the temperature of about 60° C.

In an embodiment, the second adhesive layer has a thickness from about 25 micrometers to about 100 micrometers.

In an embodiment, one side surface of the first adhesive layer protrudes outward than one side surface of the window adjacent to the one side surface of the first adhesive layer.

In an embodiment, the display device further includes a protective layer disposed on the window, and one side surface of the protective layer protrudes outward than one side surface of the window adjacent to the one side surface of the protective layer.

In an embodiment, the one side surface of the protective layer protrudes outward than one side surface of the first adhesive layer adjacent to the one side surface of the protective layer.

An embodiment of the inventive concept provides a method of manufacturing a display device. The manufacturing method includes attaching a first stack structure including a first release film, an anti-reflective layer, and a first adhesive layer disposed between the first release film and the anti-reflective layer to one surface of a display panel folded with respect to an imaginary folding axis extending in a first direction and cutting the display panel and the first stack structure attached to the display panel using a laser beam.

In an embodiment, the first stack structure further includes a second adhesive layer disposed under the anti-reflective layer.

In an embodiment, the method further includes removing the first release film from the first adhesive layer.

In an embodiment, the method further includes attaching a window to the first adhesive layer from which the first release film is removed.

In an embodiment, the display panel and the first stack structure are substantially simultaneously cut along one direction in the cutting the first stack structure using the laser beam.

In an embodiment, the first adhesive layer and the anti-reflective layer have a same area in a plan view.

In an embodiment, a temperature of the first adhesive layer rises to a range from about 150° C. to about 200° C. in the cutting the first stack structure.

In an embodiment, the first adhesive layer includes an adhesive having a change rate in a storage modulus of about 0.3 or less at a temperature of about 150° C. to about 200° C. with respect to the storage modulus at a temperature of about 60° C.

According to the above, the change rate in the storage modulus of the first adhesive layer at the temperature of about 150° C. to about 200° C. with respect to the storage modulus of the first adhesive layer at the temperature of about 60° C. is limited to about 0.3 or less, and thus, a generation of residues from the first adhesive layer is reduced.

In addition, the side surfaces of the display panel, the anti-reflective layer, and the first adhesive layer are placed on the straight line when viewed in the cross-section, and thus, the window is prevented from being damaged due to foreign substances introduced therein.

BRIEF DESCRIPTION OF THE DRAWINGS

The above and other advantages of the disclosure will become readily apparent by reference to the following detailed description when considered in conjunction with the accompanying drawings, in which.

DETAILED DESCRIPTION

Figure 1:
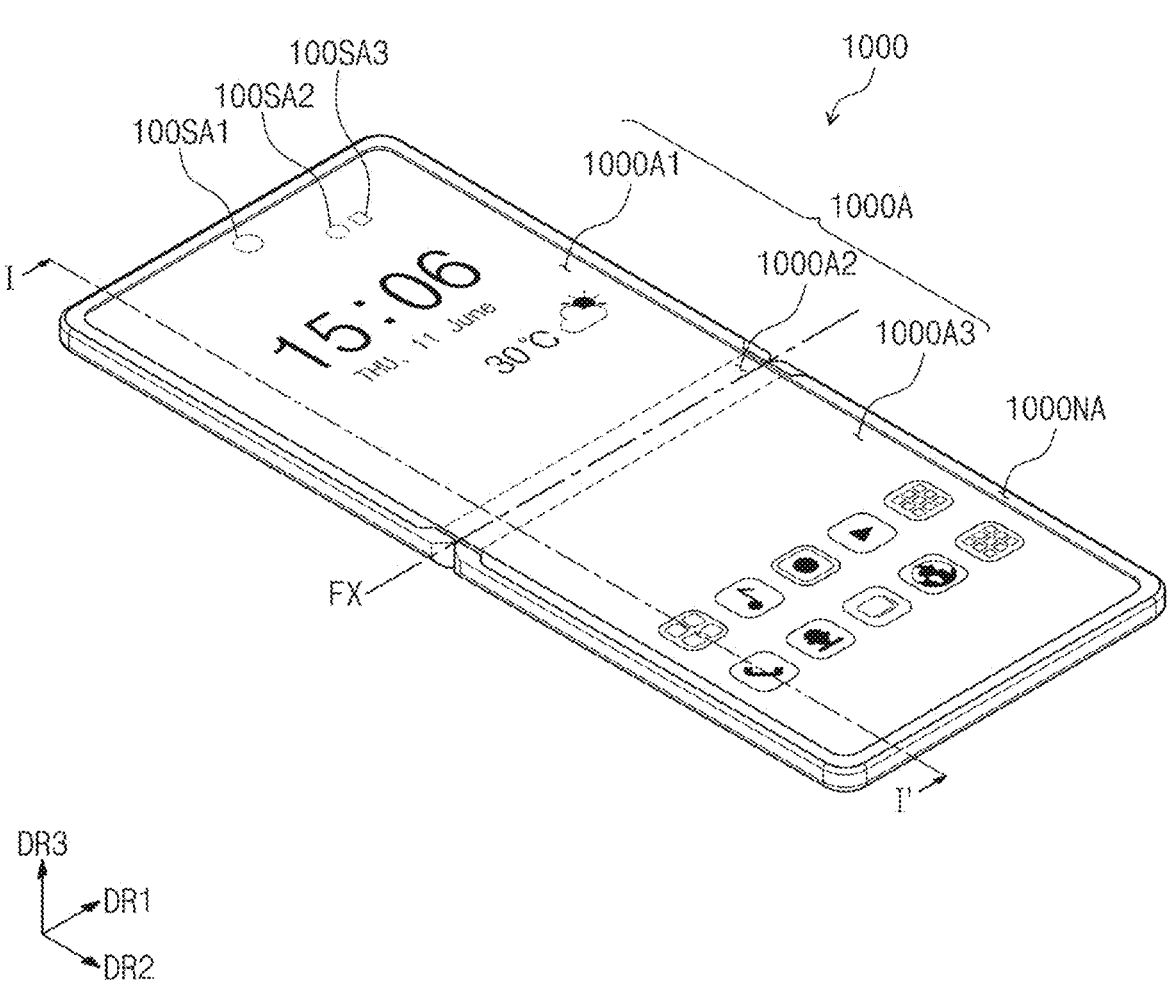
FIG. 1 is a perspective view of an embodiment of a display device according to the disclosure.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" or the like, may be used herein for ease of description to describe one element or feature's relationship to another elements or features as shown in the drawing figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a display device 1000 of the disclosure will be described with reference to accompanying drawings.

Figure 2:
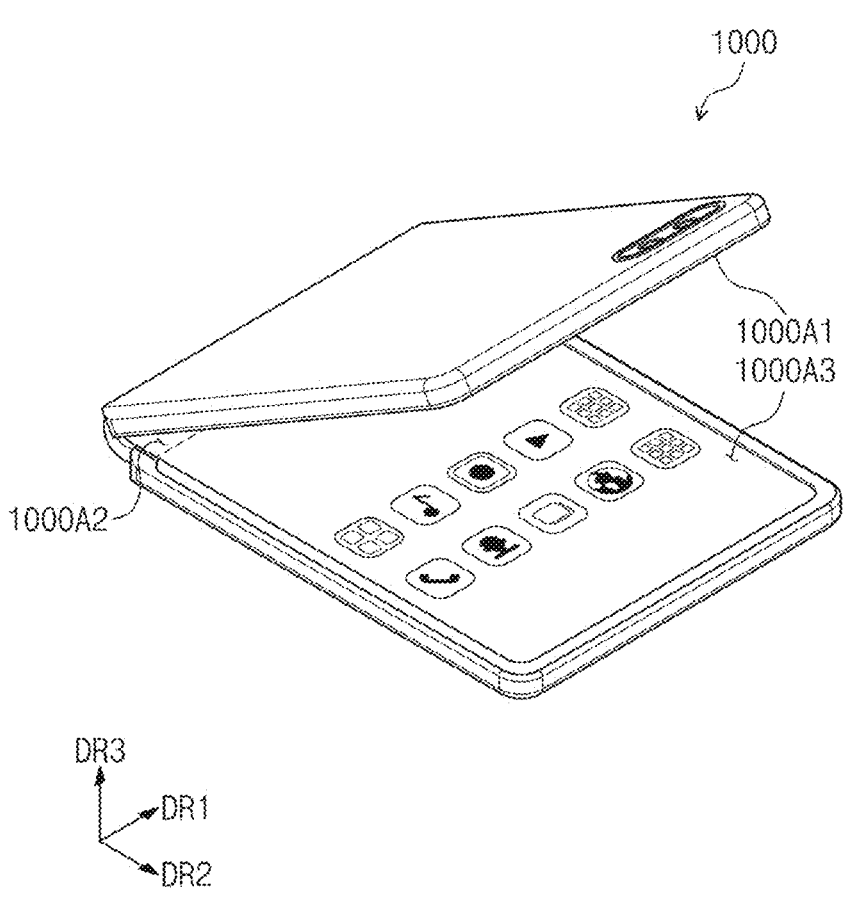
FIG. 2 is a perspective view of an embodiment of a display device according to the disclosure.

FIGS. 1 and 2 are perspective views of an embodiment of the display device 1000 according to the disclosure. FIG. 1 shows an unfolded state of the display device 1000, and FIG. 2 shows an embodiment of a folded state of the display device 1000 according to the disclosure.

Referring to FIGS. 1 and 2, the display device 1000 may be a device that is activated in response to electrical signals. The display device 1000 may be applied to a mobile phone, a tablet computer, a car navigation unit, a game unit, or a wearable device, however, it should not be limited thereto or thereby. FIGS. 1 and 2 show the mobile phone as an illustrative embodiment of the display device 1000.

The display device 1000 may display an image through an active area 1000A. The active area 1000A may include a plane defined by a first direction DR1 and a second direction DR2 in a state in which the display device 1000 is unfolded. A thickness direction of the display device 1000 may be substantially parallel to a third direction DR3 crossing the first direction DR1 and the second direction DR2. Accordingly, front (or upper) and rear (or lower) surfaces of each member of the display device 1000 may be defined with respect to the third direction DR3.

The active area 1000A may include a first area 1000A1, a second area 1000A2, and a third area 1000A3. The second area 1000A2 may be bent about a folding axis FX extending in the first direction DR1. Accordingly, the first area 1000A1 and the third area 1000A3 may be also referred to as non-folding areas, and the second area 1000A2 may be also referred to as a folding area.

When the display device 1000 is folded, the first area 1000A1 and the third area 1000A3 may face each other. Accordingly, when the display device 1000 is fully folded, the active area 1000A may not be exposed to the outside, and this folding state may be also referred to as an "in-folding". However, this is merely one of embodiments, and an operation of the display device 1000 should not be limited thereto or thereby.

In an embodiment, when the display device 1000 is folded, the first area 1000A1 and the third area 1000A3 may face opposite directions. Accordingly, the active area 1000A may be exposed to the outside in the folding state, and this folding state may be also referred to as an "out-folding".

The display device 1000 may perform only one of the in-folding and out-folding operations. In an embodiment, the display device 1000 may perform both the in-folding and the out-folding operations. In this case, the second area 1000A2 of the display device 1000 may be inwardly folded (in-folding) or outwardly folded (out-folding). In an embodiment, a portion of the display device 1000 may be inwardly folded (in-folding), and another portion of the display device 1000 may be outwardly folded (out-folding).

FIGS. 1 and 2 show one folding area and two non-folding areas as an illustrative embodiment, however, the number of the folding areas and the number of the non-folding areas should not be limited thereto or thereby. In an embodiment, the display device 1000 may include three or more non-folding areas and a plurality of folding areas disposed between the non-folding areas adjacent to each other, for example.

FIGS. 1 and 2 show the display device 1000 in which the folding axis FX is substantially parallel to a short axis of the display device 1000, however, the disclosure should not be limited thereto or thereby. In an embodiment, the folding axis FX may extend to be substantially parallel to a long axis of the display device 1000, i.e., a direction substantially parallel to the second direction DR2, for example. In this case, the first area 1000A1, the second area 1000A2, and the third area 1000A3 may be sequentially arranged in the first direction DR1.

The display device 1000 may include a plurality of sensing areas 100SA1, 100SA2, and 100SA3. FIG. 1 shows three sensing areas 100SA1, 100SA2, and 100SA3 as an illustrative embodiment, however, the number of the sensing areas 100SA1, 100SA2, and 100SA3 should not be limited to three.

The sensing areas 100SA1, 100SA2, and 100SA3 may include a first sensing area 100SA1, a second sensing area 100SA2, and a third sensing area 100SA3. In an embodiment, the first sensing area 100SA1 may overlap a camera module, and the second sensing area 100SA2 and the third sensing area 100SA3 may overlap a proximity illumination sensor, however, they should not be limited thereto or thereby.

Each of a plurality of electronic modules may receive an external input provided thereto through the first sensing area 100SA1, the second sensing area 100SA2, or the third sensing area 100SA3 or may provide an output through the first sensing area 100SA1, the second sensing area 100SA2, or the third sensing area 100SA3.

The first sensing area 100SA1, the second sensing area 100SA2, and the third sensing area 100SA3 may be included in the active area 1000A. That is, the first sensing area 100SA1, the second sensing area 100SA2, and the third sensing area 100SA3 may display the image. Each of the first sensing area 100SA1, the second sensing area 100SA2, and the third sensing area 100SA3 may have a transmittance higher than a transmittance of the active area 1000A. In addition, the first sensing area 100SA1 may have the transmittance higher than each of the transmittance of the second sensing area 100SA2 and the transmittance of the third sensing area 100SA3. However, the disclosure should not be limited thereto or thereby, and at least one of the first sensing area 100SA1, the second sensing area 100SA2, and the third sensing area 100SA3 may be defined in a peripheral area 1000NA rather than the active area 1000A. An opening may be defined in at least one of the first sensing area 100SA1, the second sensing area 100SA2, and the third sensing area 100SA3.

According to the disclosure, some electronic modules among the electronic modules may overlap the active area 1000A, and the other electronic modules among the electronic modules may be surrounded by the active area 1000A. Accordingly, it is not desired to provide an area for the arrangement of the electronic modules in the peripheral area 1000NA around the active area 1000A. As a result, a ratio of size of the active area 1000A to a front surface of the display device 1000 may increase.

Figure 3:
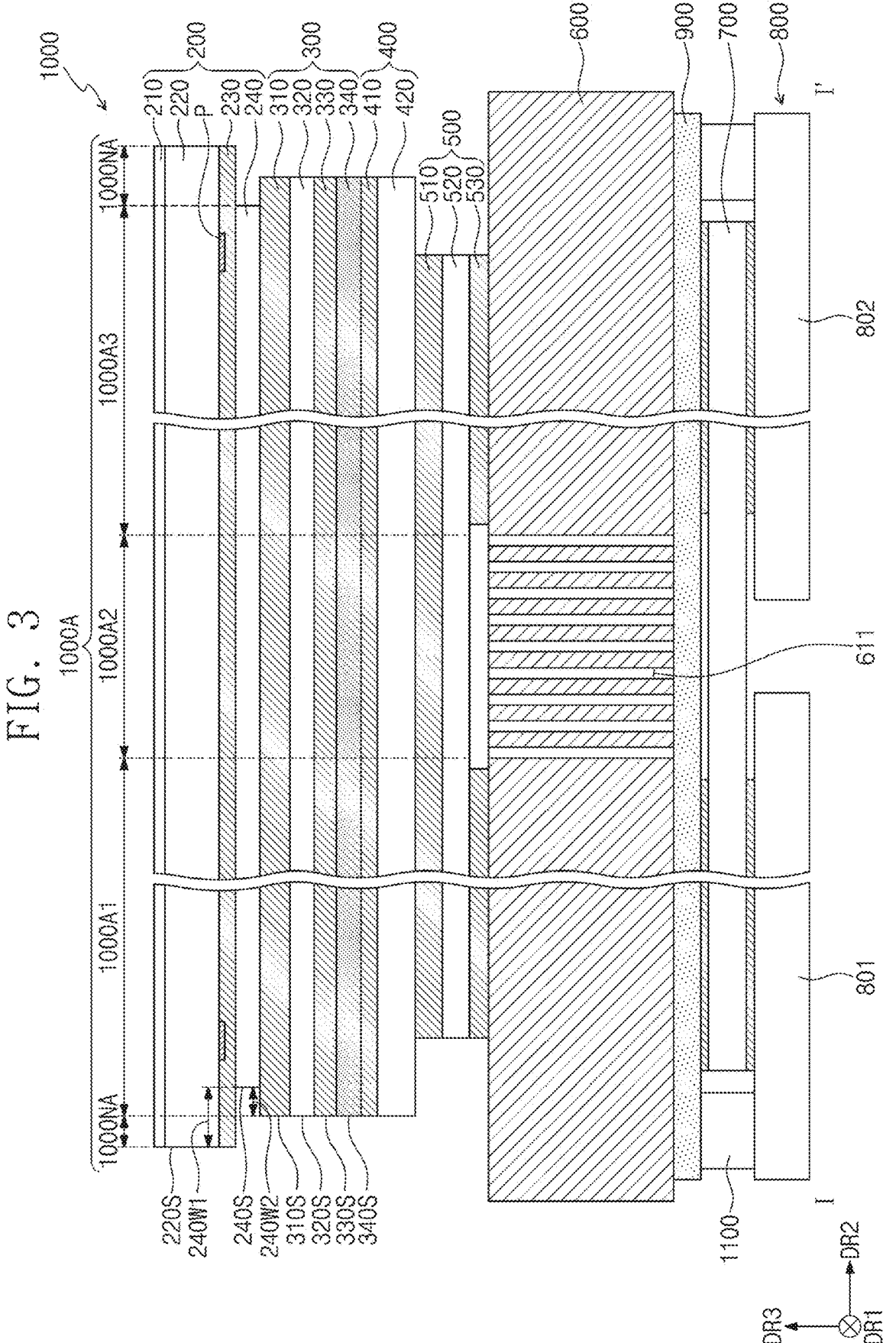
FIG. 3 is a cross-sectional view of an embodiment of a display device according to the disclosure.
Figure 4:
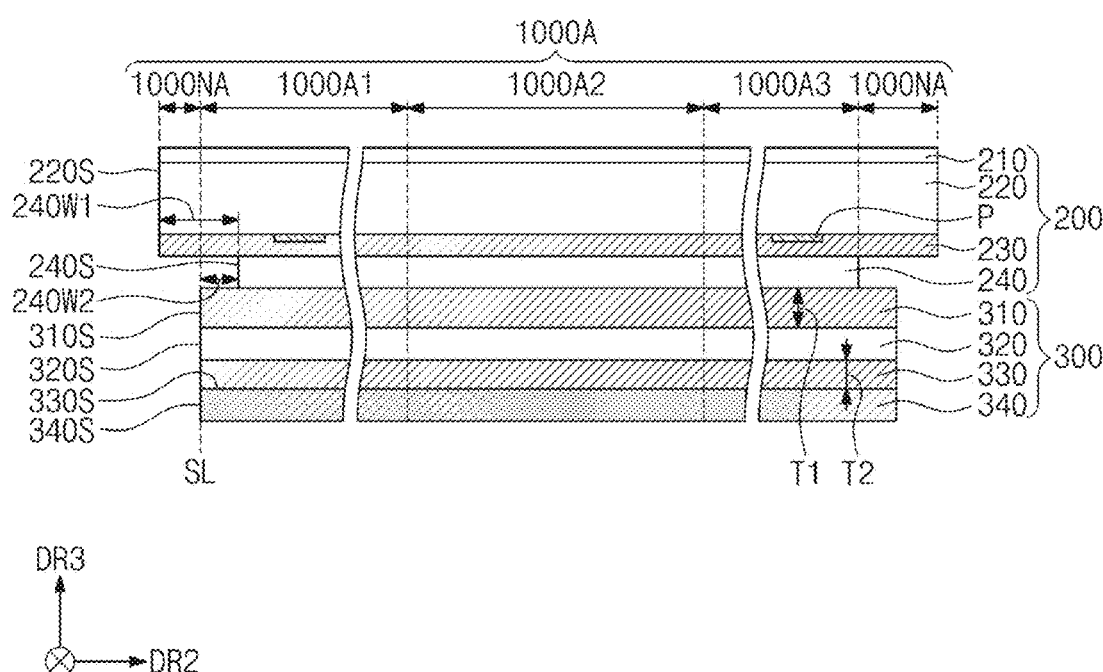
FIG. 4 is an enlarged view of an intermediate member and an upper member of FIG. 3.

FIG. 3 is a cross-sectional view of an embodiment of the display device 1000 according to the disclosure. FIG. 3 shows a cross-section of the display device 1000 taken along line I-I' of FIG. 1. FIG. 4 is an enlarged view of an upper member 200 and an intermediate member 300 of FIG. 3.

Referring to FIG. 3, the display device 1000 may include the upper member 200, the intermediate member 300, a lower member 400, a barrier member 500, a first plate 600, a heat dissipation layer 700, a second plate 800, and a cover layer 900. However, it will be understood by those of ordinary skill in the art that the display device 1000 may further include other general-purpose components in addition to the components shown in FIG. 3.

The upper member 200 will be described in detail with reference to FIGS. 3 and 4. The upper member 200 may include a hard coating layer 210, a protective layer 220, an upper adhesive layer 230, a window 240, and a light-blocking pattern P. The upper member 200 may be disposed on the intermediate member 300. Components included in the upper member 200 should not be limited thereto or thereby. At least some components among the above-mentioned components may be omitted, and other components may be added.

The hard coating layer 210 may be disposed at an outermost surface of the display device 1000. The hard coating layer 210 may be coated on the protective layer 220 as a functional layer that improves characteristics of use of the display device 1000. In an embodiment, the hard coating layer 210 may improve anti-fingerprint characteristics, anti-pollution characteristics, scratch-resistant characteristics, or the like, for example.

The protective layer 220 may be disposed under the hard coating layer 210. The protective layer 220 may be disposed on the window 240. The protective layer 220 may protect components disposed thereunder. An anti-fingerprint layer may be additionally provided to the protective layer 220 to improve properties, such as chemical resistance and abrasion resistance. The protective layer 220 may include a film having an elastic modulus equal to or smaller than about 15 gigapascals (Gpa) at room temperature. The protective layer 220 may have a thickness from about 50 micrometers to about 70 micrometers, e.g., about 65 micrometers, however, the thickness of the protective layer 220 should not be limited thereto or thereby. Although not shown in detail, the protective layer 220 may have a structure in which a plurality of films is stacked. The protective layer 220 may include a plurality of synthetic resin films coupled with each other by an adhesive.

A side surface 220S of the protective layer 220 may protrude more than a side surface 240S of the window 240 adjacent thereto. As the side surface 220S of the protective layer 220 protrudes more than the side surface 240S of the window 240, the side surface 240S of the window 240 may be prevented from being damaged due to impacts applied thereto. Accordingly, a probability of cracks on the window 240 due to the impacts may be reduced.

The side surface 220S of the protective layer 220 may protrude more than a side surface 310S of a first adhesive layer 310. As the side surface 220S of the protective layer 220 protrudes more than the side surface 310S of the first adhesive layer 310, it is possible to prevent a foreign substance from entering a separation space between the side surface 240S of the window 240 and the side surface 310S of the first adhesive layer 310.

The upper adhesive layer 230 may be disposed under the protective layer 220. The protective layer 220 may be coupled to the window 240 by the upper adhesive layer 230. The upper adhesive layer 230 may have a thickness from about 20 micrometers to about 50 micrometers, e.g., about 35 micrometers, however, the thickness of the upper adhesive layer 230 should not be limited thereto or thereby.

The window 240 may be disposed under the upper adhesive layer 230. The window 240 may be disposed on an anti-reflective layer 320 described later. The window 240 may include an optically transparent insulating material. In an embodiment, the window 240 may include a glass substrate or a synthetic resin film, for example. When the window 240 is the glass substrate, the window 240 may be a thin film glass substrate having a thickness equal to or smaller than about 80 micrometers. In an embodiment, the window 240 may have a thickness of about 31 micrometers, however, the thickness of the window 240 should not be limited thereto or thereby.

When the window 240 is the synthetic resin film, the window 240 may include a polyimide ("PI") film or a polyethylene terephthalate ("PET") film.

The window 240 may have a single-layer or multi-layer structure. In an embodiment, the window 240 may include a plurality of synthetic resin films coupled to each other by an adhesive or a glass substrate and a synthetic resin film coupled to the glass substrate by an adhesive, for example.

A first distance 240W1 between the side surface 240S of the window 240 and the side surface 220S of the protective layer 220 may be equal to or greater than a predetermined distance. The first distance 240W1 may be a distance measured in a direction substantially parallel to the second direction DR2. In addition, when viewed in the plane, the first distance 240W1 may correspond to the distance between the side surface 220S of the protective layer 220 and the side surface 240S of the window 240.

The first distance 240W1 may be within a range from about 180 micrometers to about 250 micrometers, e.g., about 210 micrometers, however, it should not be limited thereto or thereby. In an embodiment, the first distance 240W1 may be equal to or greater than about 50 micrometers or may be about 300 micrometers. As the first distance 240W1 increases, the protective layer 220 may protrude more than the window 240, and a portion of the protective layer 220 may be bent and may be attached to other components, e.g., a case. In addition, as an area of the protective layer 220 increases, a probability that a foreign material introduced from an upper side of the protective layer 220 flows into a lower side of the protective layer 220 may be reduced.

The light-blocking pattern P may be disposed under the protective layer 220. The light-blocking pattern P may be provided by being printed on a lower surface of the protective layer 220 and may be covered by the upper adhesive layer 230. The light-blocking pattern P may be disposed adjacent to an edge of the protective layer 220. The light-blocking pattern P may be a colored layer and may be formed by a coating method. The light-blocking pattern P may include a colored organic material or an opaque metal, however, materials constituting the light-blocking pattern P should not be limited thereto or thereby.

FIG. 4 shows a structure in which the light-blocking pattern P is disposed under the protective layer 220, however, a location of the light-blocking pattern P should not be limited thereto or thereby. In an embodiment, the light-blocking pattern P may be disposed on an upper surface of the protective layer 220, an upper surface of the window 240, or a lower surface of the window 240, for example. In addition, the light-blocking pattern P may include a plurality of layers. In this case, some layers of the light-blocking pattern P may be disposed on the lower surface of the protective layer 220, and the other layers of the light-blocking pattern P may be disposed on the upper surface of the protective layer 220, the upper surface of the window 240, or the lower surface of the window 240.

The intermediate member 300 may include the first adhesive layer 310, the anti-reflective layer 320, a second adhesive layer 330, and a display panel 340. The intermediate member 300 may be disposed between the lower member 400 and the upper member 200. Components included in the intermediate member 300 should not be limited to those described above. At least one of the components included in the intermediate member 300 may be omitted, or other components may be further provided as components of the intermediate member 300.

The first adhesive layer 310 may be disposed between the window 240 and the anti-reflective layer 320. The first adhesive layer 310 may provide an adhesion to attach the window 240 to the anti-reflective layer 320. The first adhesive layer 310 may be a pressure sensitive adhesive ("PSA"), an optically clear adhesive ("OCA"), or an optically clear resin ("OCR").

In the case where the pressure sensitive adhesive is used as the first adhesive layer 310, a stress of layers having a modulus of several Mpa or more may be reduced when folding the display device 1000. In this case, however, the first adhesive layer 310 is desired to be designed with a predetermined material and thickness according to a stack structure for the reliability in the folding operations. The first adhesive layer 310 should not be limited thereto or thereby, and various adhesives may be used as the first adhesive layer 310.

The first adhesive layer 310 may include an adhesive having a storage modulus of about 10 kilopascals (Kpa) to about 50 Kpa at a temperature of about 60 degrees Celsius (° C.). When the storage modulus of the first adhesive layer 310 is smaller than about 10 Kpa at the temperature of about 60° C., a heat resistance of the first adhesive layer 310 may not be sufficient, and when the storage modulus of the first adhesive layer 310 is greater than about 50 Kpa at the temperature of about 60° C., a high-temperature change rate of the first adhesive layer 310 may not be normal.

The first adhesive layer 310 may include an adhesive having a change rate in the storage modulus of about 0.3 or less at a temperature of about 150° C. to about 200° C. with respect to the storage modulus at the temperature of about 60° C. In the case where the change rate in the storage modulus of the first adhesive layer 310 at the temperature of about 150° C. to about 200° C. with respect to the storage modulus at the temperature of about 60° C. is large, a residual adhesive of the first adhesive layer 310 may be generated when the temperature of the first adhesive layer 310 reaches of about 150° C. to about 200° C. This will be described in detail with reference to a method of manufacturing the display device 1000 (refer to FIG. 3).

The first adhesive layer 310 may have a thickness T1 from about 25 micrometers (μm) to about 100 μm. When the thickness T1 of the first adhesive layer 310 is greater than about 100 μm, the residual adhesive of the first adhesive layer 310 generated at the substantially high temperature of about 150° C. to about 200° C. may exceed acceptable limits. When the thickness T1 of the first adhesive layer 310 is smaller than about 25 μm, the first adhesive layer 310 may not provide sufficient adhesion.

The side surface 310S of the first adhesive layer 310 may protrude more than the side surface 240S of the window 240 adjacent thereto. In a case where the side surface 310S of the first adhesive layer 310 is placed inside the side surface 240S of the window 240, a separation space may be generated between the side surface 220S of the protective layer 220 and the side surface 240S of the window 240 and between the side surface 240S of the window 240 and the side surface 310S of the first adhesive layer 310. When foreign substances or contaminants enter the separation space, damages such as cracks may occur in the window 240.

In an embodiment, when a positional relationship between layers is changed due to the folding operation of the display device 1000, foreign substances may enter the space between the side surface 220S of the protective layer 220 and the first adhesive layer 310 and between the side surface 240S of the window 240 and the first adhesive layer 310, a stress may be applied to the window 240, and as a result, cracks may occur in the window 240. The cracks of the window 240 may cause defects to the display device 1000.

A second distance 240W2 between the side surface 310S of the first adhesive layer 310 and the side surface 240S of the window 240 may be about 200 μm or less. In a case where the side surface 310S of the first adhesive layer 310 protrudes beyond about 200 μm from the side surface 240S of the window 240, the upper adhesive layer 230 may be attached to the first adhesive layer 310 by a pressure applied along the third direction DR3. As a result, a buckling phenomenon may occur on the window 240 since the window 240 does not slip during the folding operation of the display device 1000.

Although not shown in drawing figures, an impact absorbing layer and a hard coating layer may be further provided under the first adhesive layer 310. The impact absorbing layer may be a functional layer to protect the display panel 340 from external impacts. The impact absorbing layer may be selected from films having an elastic modulus equal to or greater than about 1 GPa at room temperature. The hard coating layer may be provided on the impact absorbing layer. However, the impact absorbing layer and the hard coating layer may be omitted.

The anti-reflective layer 320 may be disposed on the display panel 340. The anti-reflective layer 320 may reduce a reflectance with respect to an external light incident thereto from the outside. The anti-reflective layer 320 may include a stretching type synthetic resin film. However, this is merely one of embodiments, and a material for the anti-reflective layer 320 should not be limited thereto or thereby.

The anti-reflective layer 320 may have a thickness from about 25 micrometers to about 35 micrometers, e.g., about 31 micrometers, however, the thickness of the anti-reflective layer 320 should not be limited thereto or thereby.

The anti-reflective layer 320 may include a polarizer. The anti-reflective layer 320 including the polarizer may reflect only a portion of the external light, and thus, an amount of the reflected light may be reduced.

The anti-reflective layer 320 may include a destructive interference structure. In an embodiment, the destructive interference structure may include a first reflective layer and a second reflective layer disposed in a layer different from a layer in which the first reflective layer is disposed, for example. A first reflective light and a second reflective light, which are respectively reflected from the first reflective layer and the second reflective layer, may destructively interfere with each other, and thus, the reflectance of the external light may be reduced.

The second adhesive layer 330 may be disposed between the display panel 340 and the anti-reflective layer 320. The second adhesive layer 330 may provide an adhesion to attach the display panel 340 to the anti-reflective layer 320. As the second adhesive layer 330, a pressure sensitive adhesive ("PSA"), an optically clear adhesive ("OCA"), and an optically clear resin ("OCR") may be used. However, the second adhesive layer 330 should not be limited there to or thereby, and various adhesives may be used as the second adhesive layer 330.

The second adhesive layer 330 may include an adhesive having a change rate in the storage modulus of about 0.3 or less at a temperature of about 150° C. to about 200° C. with respect to the storage modulus at the temperature of about 60° C. In addition, the second adhesive layer 330 may include an adhesive having the storage modulus of about 10 Kpa to about 50 Kpa at the temperature of about 60° C.

The second adhesive layer 330 may have a thickness T2 from about 25 μm to about 100 μm. When the thickness T2 of the second adhesive layer 330 is greater than about 100 μm, residues of the second adhesive layer 330 may be excessively generated at substantially high temperature of about 150° C. to about 200° C. When the thickness T2 of the second adhesive layer 330 is smaller than about 25 μm, the second adhesive layer 330 may not provide sufficient adhesive.

The display panel 340 may have a configuration that generates the image and senses inputs applied thereto from the outside. In an embodiment, although not shown in FIG. 4, the display panel 340 may include a display layer and a sensor layer, for example. The display panel 340 may be folded with respect to the folding axis FX (refer to FIG. 1) extending in the first direction DR1. The display panel 340 may have a thickness from about 25 micrometers to about 35 micrometers, e.g., about 30 micrometers, however, the thickness of the display panel 340 should not be limited thereto or thereby.

A side surface 340S of the display panel 340, the side surface 320S of the anti-reflective layer 320, the side surface 310S of the first adhesive layer 310, and a side surface 330S of the second adhesive layer 330 may be placed on a straight line in a cross-section. That is, when viewed in a plane defined by the second direction DR2 and third direction DR3 as shown in FIG. 4, the side surface 340S of the display panel 340, the side surface 320S of the anti-reflective layer 320, the side surface 310S of the first adhesive layer 310, and the side surface 330S of the second adhesive layer 330 may be placed on a side line SL. The side line SL may protrude outward than the side surface 240s of the window 240. Accordingly, a contact area of the window 240 with outside may be reduced, and thus the possibility of damage to the window 240 due to inflow of foreign substance may be reduced.

In an embodiment, in a case where the side surface 310S of the first adhesive layer 310 is placed inside the side surface 240S of the window 240 and the side surface 320S of the anti-reflective layer 320 is placed inside the side surface 310S of the first adhesive layer 310, an area which the window 240 contacts outside may be increase, and thus, the foreign substances from the outside may be easily introduced.

The side line SL may be perpendicular to an upper surface of the display panel 340. Since the side line SL is perpendicular to the upper surface of the display panel 340, the contact area of outside and display panel 340, the anti-reflective layer 320, and the first adhesive layer 310 may be reduced, and thus, the introduction of the foreign substances may be reduced.

Referring to FIG. 3, the lower member 400 may include a lower adhesive layer 410 and a lower protective film 420. The lower member 400 may be disposed under the intermediate member 300.

The lower protective film 420 may be coupled to a rear surface of the display panel 340 by the lower adhesive layer 410. The lower protective film 420 may prevent the rear surface of the display panel 340 from being scratched during a manufacturing process of the display panel 340. The lower protective film 420 may be a polyimide ("PI") film or a polyethylene terephthalate ("PET") film. The lower protective film 420 may be a colored film. In an embodiment, the lower protective film 420 may be an opaque yellow film, however, it should not be limited thereto or thereby, for example.

The barrier member 500 may include an upper barrier adhesive layer 510, a barrier layer 520, and a lower barrier adhesive layer 530. The barrier member 500 may be disposed under the lower protective film 420.

The barrier layer 520 may increase a resistance to a compressive force caused by external pressure. Accordingly, the barrier layer 520 may prevent the display panel 340 from being deformed. The barrier layer 520 may include a flexible plastic material, e.g., polyimide or polyethylene terephthalate.

The barrier layer 520 may be coupled to a rear surface of the lower protective film 420 by the upper barrier adhesive layer 510. The barrier layer 520 may be coupled to an upper surface of the first plate 600 by the lower barrier adhesive layer 530.

The first plate 600 may be disposed under the barrier member 500. The first plate 600 may include a material having an elastic modulus equal to or greater than about 60 GPa at room temperature. The first plate 600 may include a single metal material or an alloy of a plurality of metal materials.

The first plate 600 may be provided with an opening 611 defined therethrough. The opening 611 may be defined through an area of the first plate 600, which overlaps the second area 1000A2. Due to the opening 611, a shape of a portion of the first plate 600 may be more easily changed.

The second plate 800 may include a first sub-plate 801 and a second sub-plate 802. The first sub-plate 801 may be placed to overlap the first area 1000A1 and a portion of the second area 1000A2, and the second sub-plate 802 may be placed to overlap the other portion of the second area 1000A2 and the third area 1000A3. The first sub-plate 801 and the second sub-plate 802 may be arranged spaced apart from each other in the second area 1000A2.

The heat dissipation layer 700 may be disposed between the first plate 600 and the second plate 800. The heat dissipation layer 700 may be disposed between the cover layer 900 and the second plate 800. The heat dissipation layer 700 may perform a heat dissipation function. In an embodiment, an outer walls 1100 may be also disposed between the cover layer 900 and the second plate 800, and the outer walls 1100 may surround the heat dissipation layer 700, but is not limited thereto.

The cover layer 900 may be disposed under the first plate 600. The cover layer 900 may cover the opening 611 of the first plate 600. The cover layer 900 may be a flexible film. The cover layer 900 may include a material having an elastic modulus equal to or smaller than about 30 Mpa and a stretching rate equal to or greater than about 100%.

Hereinafter, the manufacturing method of the display device 1000 will be described.

Figure 5:
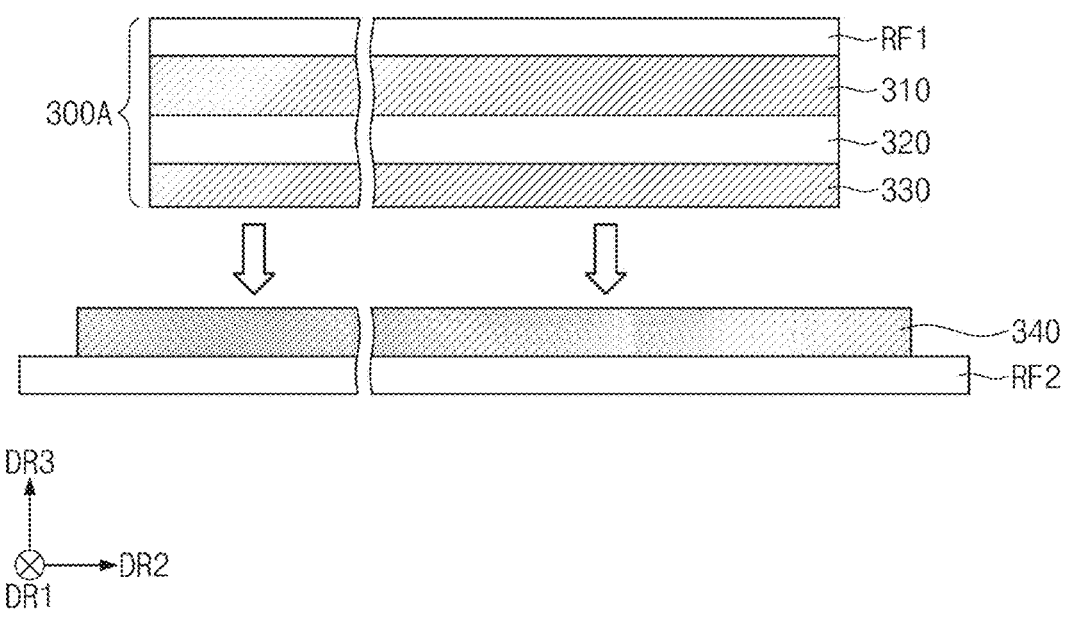
FIG. 5 is a view of an embodiment of a process of attaching a first stack structure according to the disclosure.
Figure 6A:
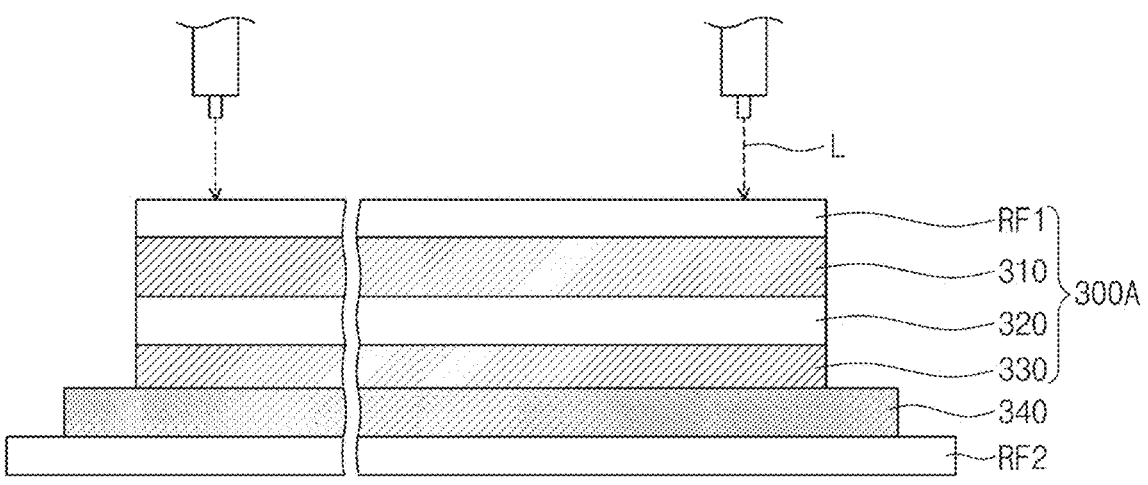
FIGS. 6A and 6B are views of an embodiment of a process of cutting using a laser beam according to the disclosure.
Figure 6A:
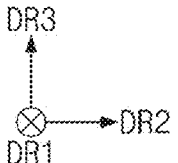
Figure 6B:
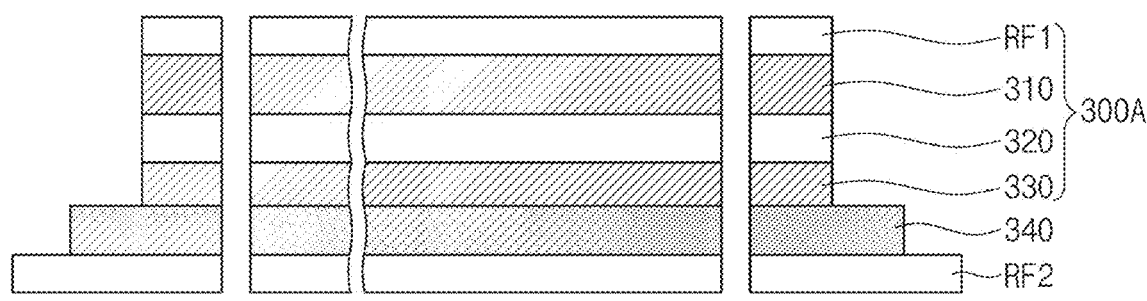
Figure 6B:
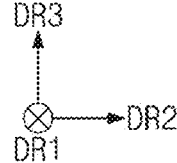
Figure 7A:
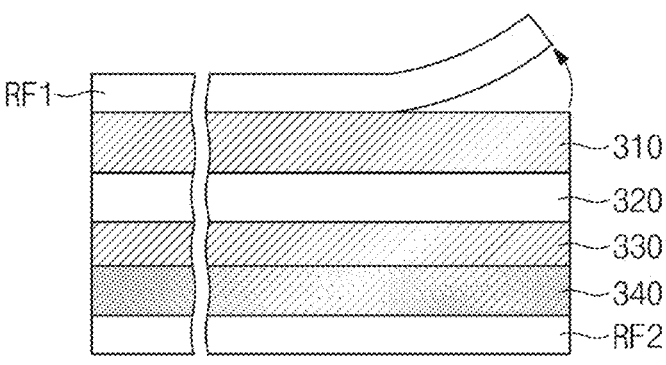
FIGS. 7A and 7B are views of an embodiment of a process of removing a first release film according to the disclosure.
Figure 7A:
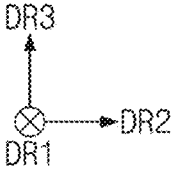
Figure 7B:
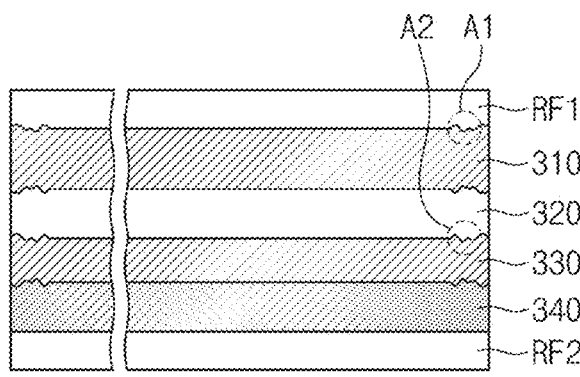
Figure 7B:
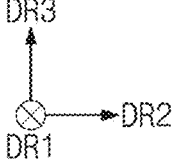
Figure 8:
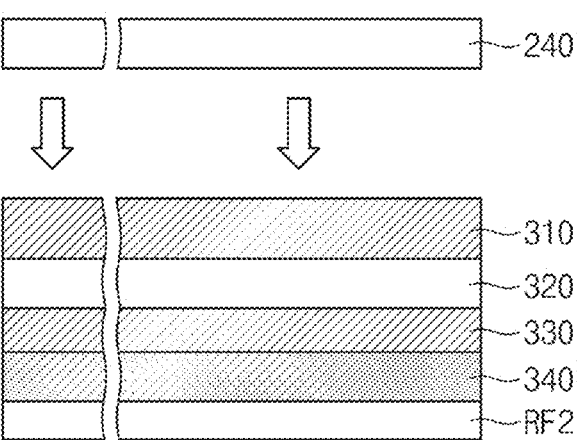
FIG. 8 is a view of an embodiment of a process of attaching a window according to the disclosure.
Figure 8:
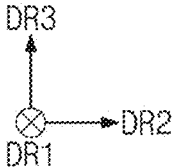

FIG. 5 is a view of an embodiment of a process of attaching a first stack structure 300A according to the disclosure. FIGS. 6A and 6B are views of an embodiment of a process of cutting using a laser beam according to the disclosure. FIGS. 7A and 7B are views of an embodiment of a process of removing a first release film RF1 according to the disclosure. FIG. 8 is a view of an embodiment of a process of attaching the window 240 according to the disclosure.

Referring to FIG. 5, the first stack structure 300A may be attached to one surface of the display panel 340. A second release film RF2 may be attached to a lower surface of the display panel 340 to protect the display panel 340.

The first stack structure 300A may include the anti-reflective layer 320, the first adhesive layer 310, and the first release film RF1, which are sequentially stacked. The first stack structure 300A may further include the second adhesive layer 330 coupled to the lower surface of the anti-reflective layer 320. The first stack structure 300A may move integrally as a whole in the stack state. The first adhesive layer 310 and the anti-reflective layer 320 may have substantially the same area as each other when viewed in the plane.

Referring to FIGS. 6A and 6B, the display panel 340 and the first stack structure 300A attached to the display panel 340 may be cut using a laser beam L (hereinafter, also referred to as a laser cutting process). In this case, the display panel 340 and the first stack structure 300A attached to the display panel 340 may be substantially simultaneously cut along one direction. Side surfaces of the display panel 340 and the first stack structure 300A, each to which the laser cutting process is applied, may be aligned on a straight line.

In the laser cutting process, the temperature of the first adhesive layer 310 may rise to a range from about 150° C. to about 200° C. Since the display panel 340 and the first stack structure 300A attached to the display panel 340 are cut using a high-temperature laser beam in the laser cutting process, the temperature of the first adhesive layer 310 may rise to the range from about 150° C. to about 200° C. higher than a temperature at which the completed display panel 340 is used, and thus, deformed residues of the first adhesive layer 310 may be generated. The deformed residues may mean the deformed portion of the first adhesive layer 310 that infiltrates another layer in contact with the first adhesive layer 310 when the first adhesive layer 310 is deformed at a substantially high temperature.

Accordingly, the first adhesive layer 310 may have the storage modulus from about 10 Kpa to about 50 Kpa at the temperature of about 60° C. and may include the adhesive having the change rate in the storage modulus of about 0.3 or less at a temperature of about 150° C. to about 200° C. with respect to the storage modulus at the temperature of about 60° C. to reduce the deformed residues.

Hereinafter, the process of removing the first release film RF1 according to whether there are deformed residues A1 and A2 in the first adhesive layer 310 and the second adhesive layer 330 will be described with reference to FIGS. 7A and 7B.

In a case where the residues A1 of the first adhesive layer 310 are not generated as shown in FIG. 7A, it is not difficult to remove the first release film RF1 from the upper surface of the first adhesive layer 310. However, in a case where the residues A1 of the first adhesive layer 310 are generated and remain on the first release film RF1 as shown in FIG. 7B, the first release film RF1 may not be separated from the first adhesive layer 310 since the first release film RF1 and the first adhesive layer 310 are deformed together with each other.

In addition, when the residues A2 of the second adhesive layer 330 are generated, deformations may be generated in the anti-reflective layer 320 and the display panel 340, which contact upper and lower surfaces of the second adhesive layer 330, respectively, and thus, a quality of the display device 1000 may be deteriorated. Accordingly, it is important to limit and specify physical properties of the first adhesive layer 310 as described above and to use the same adhesive for both the first and second adhesive layers 310 and 330 so as to minimize the generation of the residues A1 and A2 in the first and second adhesive layers 310 and 330.

Referring to FIG. 8, the window 240 may be attached to the upper surface of the first adhesive layer 310 from which the first release film RF1 is removed (hereinafter, also referred to as a window attaching process). In this case, both side surfaces of the window 240 may not be misaligned with both side surfaces of the first adhesive layer 310.

Hereinafter, a removal success rate of the first release film RF1 according to the physical properties of the first adhesive layer 310 is described with reference to Table 1.

In Embodiment examples 1 to 3, the change rate in the storage modulus of the first adhesive layer 310 at the temperature of about 150° C. to about 200° C. with respect to the storage modulus of the first adhesive layer 310 at the temperature of about 60° C. is about 0.3 or less. In a Comparative example, the change rate in the storage modulus of the first adhesive layer 310 at the temperature of about 150° C. to about 200° C. with respect to the storage modulus of the first adhesive layer 310 at the temperature of about 60° C. is greater than about 0.3. The removal success rate of the first release film RF1 of Embodiment examples 1 to 3 and Comparative example are shown in Table 1.

TABLE 1

| | Embodiment example 1 | Embodiment example 2 | Embodiment example 3 | Comparative example |
|---|---|---|---|---|
| Change rate of storage modulus (150° C./ 60° C.) | 0.04 | 0.06 | 0.28 | 0.33 |
| Change rate of storage modulus (200° C./ 60° C.) | 0.04 | 0.06 | 0.28 | 0.8 |
| First release film removal attempts | 8 | 8 | 6 | 8 |
| Removal failure | 0 | 0 | 0 | 3 |
| Removal success rate | 100% | 100% | 100% | 62.5% |

In Table 1, the change rate of the storage modulus is a value obtained by dividing a difference between the storage modulus at the temperature of about 60° C. and the storage modulus at the temperature of about 150° C. or about 200° C. by the storage modulus at the temperature of about 60° C.

The storage modulus of the first adhesive layer 310 in Embodiment example 1 is about 26 Kpa at the temperature of about 60° C., about 25 Kpa at the temperature of about 150° C., and about 25 Kpa at the temperature of about 200° C.

The storage modulus of the first adhesive layer 310 in Embodiment example 2 is about 34 Kpa at the temperature of about 60° C., about 32 Kpa at the temperature of about 150° C., and about 32 Kpa at the temperature of about 200° C.

The storage modulus of the first adhesive layer 310 in Embodiment example 3 is about 25 Kpa at the temperature of about 60° C., about 18 Kpa at the temperature of about 150° C., and about 18 Kpa at the temperature of about 200° C.

The storage modulus of the first adhesive layer 310 in Comparative example is about 30 Kpa at the temperature of about 60° C., about 20 Kpa at the temperature of about 150° C., and about 6 Kpa at the temperature of about 200° C.

Removal attempts to remove the first release film RF1 from the first adhesive layer 310 are made 8 times, 8 times, and 6 times respectively in Embodiment examples 1 to 3, and the removal success rate in each of Embodiment examples 1 to 3 is 100%.

In the Comparative example, the change rates in the storage modulus at the temperatures of about 150° C. and about 200° C. with respect to the storage modulus at the temperature of about 60° C. are respectively 0.33 and 0.8 that are greater than 0.3. In the Comparative example, removal attempts to remove the first release film RF1 from the first adhesive layer 310 are made 8 times, however, only 5 attempts are successful out of 8 attempts. Therefore, the removal success rate in the Comparative example is about 62.5%.

Referring to the results in Table 1, the removal success rate of the first release film RF1 is substantially high when the change rate in the storage modulus at the temperatures of about 150° C. to about 200° C. with respect to the storage modulus at the temperature of about 60° C. is about 0.3 or less.

Although the embodiments of the disclosure have been described, it is understood that the disclosure should not be limited to these embodiments but various changes and modifications may be made by one ordinary skilled in the art within the spirit and scope of the disclosure as hereinafter claimed. Therefore, the disclosed subject matter should not be limited to any single embodiment described herein, and the scope of the inventive concept shall be determined according to the attached claims.

What is claimed is:

1. A display device comprising:
    a display panel folded with respect to an imaginary folding axis extending in a first direction;
    an anti-reflective layer disposed on the display panel;
    a window disposed on the anti-reflective layer; and
    a first adhesive layer disposed between the anti-reflective layer and the window, the first adhesive layer comprising:
        an adhesive having a change rate in a storage modulus of about 0.3 or less at a temperature of about 150 degrees Celsius to about 200 degrees Celsius with respect to the storage modulus at a temperature of about 60 degrees Celsius,
    wherein the adhesive of the first adhesive layer has the storage modulus from about 10 kilopascals to about 50 kilopascals at the temperature of about 60 degrees Celsius.

2. The display device of claim 1, wherein the first adhesive layer has a thickness from about 25 micrometers to about 100 micrometers.

3. The display device of claim 1, wherein one side surface of the anti-reflective layer and one side surface of the first adhesive layer adjacent to the one side surface of the anti-reflective layer are placed on a straight line when viewed in a cross-section.

4. The display device of claim 3, wherein one side surface of the display panel adjacent to the one side surface of the anti-reflective layer is placed on the straight line when viewed in the cross-section.

5. The display device of claim 3, wherein the one side surface of the anti-reflective layer is perpendicular to an upper surface of the display panel.

6. The display device of claim 1, further comprising a second adhesive layer disposed between the display panel and the anti-reflective layer.

7. The display device of claim 6, wherein the second adhesive layer comprises an adhesive having the change rate in the storage modulus of about 0.3 or less at the temperature of about 150 degrees Celsius to about 200 degrees Celsius with respect to the storage modulus at the temperature of about 60 degrees Celsius.

8. The display device of claim 6, wherein the second adhesive layer has a thickness from about 25 micrometers to about 100 micrometers.

9. A display device comprising:

a display panel folded with respect to an imaginary folding axis extending in a first direction;

an anti-reflective layer disposed on the display panel;

a window disposed on the anti-reflective layer; and a first adhesive layer disposed between the anti-reflective layer and the window, the first adhesive layer comprising:

an adhesive having a change rate in a storage modulus of about 0.3 or less at a temperature of about 150 degrees Celsius to about 200 degrees Celsius with respect to the storage modulus at a temperature of about 60 degrees Celsius, wherein one side surface of the first adhesive layer protrudes outward than one side surface of the window adjacent to the one side surface of the first adhesive layer.

10. The display device of claim 1, further comprising a protective layer disposed on the window, wherein one side surface of the protective layer protrudes outward than one side surface of the window adjacent to the one side surface of the protective layer.

11. The display device of claim 10, wherein the one side surface of the protective layer protrudes outward than one side surface of the first adhesive layer adjacent to the one side surface of the protective layer.

12. A method of manufacturing a display device, the method comprising:

attaching a first stack structure comprising a first release film, an anti-reflective layer, and a first adhesive layer disposed between the first release film and the anti-reflective layer to one surface of a display panel folded with respect to an imaginary folding axis extending in a first direction; and cutting the display panel and the first stack structure attached to the display panel using a laser beam, wherein a temperature of the first adhesive layer rises to a range from about 150 degrees Celsius to about 200 degrees Celsius in the cutting the first stack structure.

13. The method of claim 12, wherein the first stack structure further comprises a second adhesive layer disposed under the anti-reflective layer.

14. The method of claim 12, further comprising removing the first release film from the first adhesive layer.

15. The method of claim 12, further comprising attaching a window to the first adhesive layer from which the first release film is removed.

16. The method of claim 12, wherein the display panel and the first stack structure are substantially simultaneously cut along one direction in the cutting the first stack structure using the laser beam.

17. The method of claim 12, wherein the first adhesive layer and the anti-reflective layer have a same area in a plan view.

18. The method of claim 12, wherein the first adhesive layer comprises an adhesive having a change rate in a storage modulus of about 0.3 or less at a temperature of about 150 degrees Celsius to about 200 degrees Celsius with respect to the storage modulus at a temperature of about 60 degrees Celsius.

* * * * *